United States Patent [19]
Lee

[11] 3,777,683
[45] Dec. 11, 1973

[54] APPARATUS FOR MANUFACTURING LOOPS OF ELASTICISED MATERIAL

[75] Inventor: Harold Barry Lee, Heidelberg, Victoria, Australia

[73] Assignee: Bond's Wear Pty. Limited, New South Wales, Australia

[22] Filed: Mar. 28, 1972

[21] Appl. No.: 238,909

[30] Foreign Application Priority Data
Mar. 30, 1971 Australia............................ PA 4452

[52] U.S. Cl. ......................................... 112/121.27
[51] Int. Cl. ......................................... D05b 23/00
[58] Field of Search................. 112/121.27; 227/64, 227/105, 3

[56] References Cited
UNITED STATES PATENTS

| 1,977,825 | 10/1934 | Giles | 227/105 |
| 3,426,708 | 2/1969 | Andersson | 112/121.26 |
| 3,448,707 | 6/1969 | Thomsen | 112/121.26 |

Primary Examiner—James R. Boler
Attorney—Dexter N. Shaw et al.

[57] ABSTRACT

Apparatus to manufacture loops from elasticised material. The apparatus comprising material feed means whereby an end of strip material is transferred to a rotating work head which forms a loop of material and securing and severing means to fasten overlying parts of the material to form a loop and sever the loop from the strip material.

5 Claims, 8 Drawing Figures

APPARATUS FOR MANUFACTURING LOOPS OF ELASTICISED MATERIAL

In the manufacture of garments such as briefs for men and women it is desirable to have elasticated waistbands.

The object of this invention is to provide a machine which will manufacture loops of elasticised material. Preferably the machine also transfers the loop to a storage position or directly onto a garment as it is moved along a production line.

Accordingly the invention provides a machine for manufacturing loops of elasticised material, said machine comprising a rotatable work-head having a circular periphery and a central axis of rotation, bearing means on a frame to support the work head, a stitching machine fixed to the frame in operative relationship to an anvil fitted to the periphery of the work head, gripper means on the work head biased to a grip position on said anvil and releasable by first cam means on the frame, an arm universally pivotally mounted on the frame, an openable beak biased to closed position fixed to the arm, means to bias the arm to a position where the beak occupies a first position, second and third cam means on the frame adapted to move the arm and thus the beak through a path of travel which is substantially rectangular the four terminal points of said path defining four operative positions for said beak, fourth cam means on the frame to open the beak, and drive means adapted to rotate said work head and move the beak between its four operative positions and actuate said stitcher and actuate a material severing device, the operation of said machine being to move the beak from its first position to its second position with the beak open to close the beak to grip the end of a strip from a material supply which is to be formed into a loop, to move the beak to its third position to locate the strip behind the beak under the gripper which is open and over the anvil, to close the gripper to clamp the material on the anvil and to open the beak and move it to its fourth position, to rotate the work head and at the same time move the beak from the fourth to the first position, upon completion of one rotation of the work head to operate the stapler to form a loop of material and at the same time move the beak to its second position and grip the material supply behind the staple forming the loop, to actuate the severing device to cut the material supply strip between the staple and the beak and release the gripper.

The drawings illustrating one form of the invention are as follows.

Figure 1:
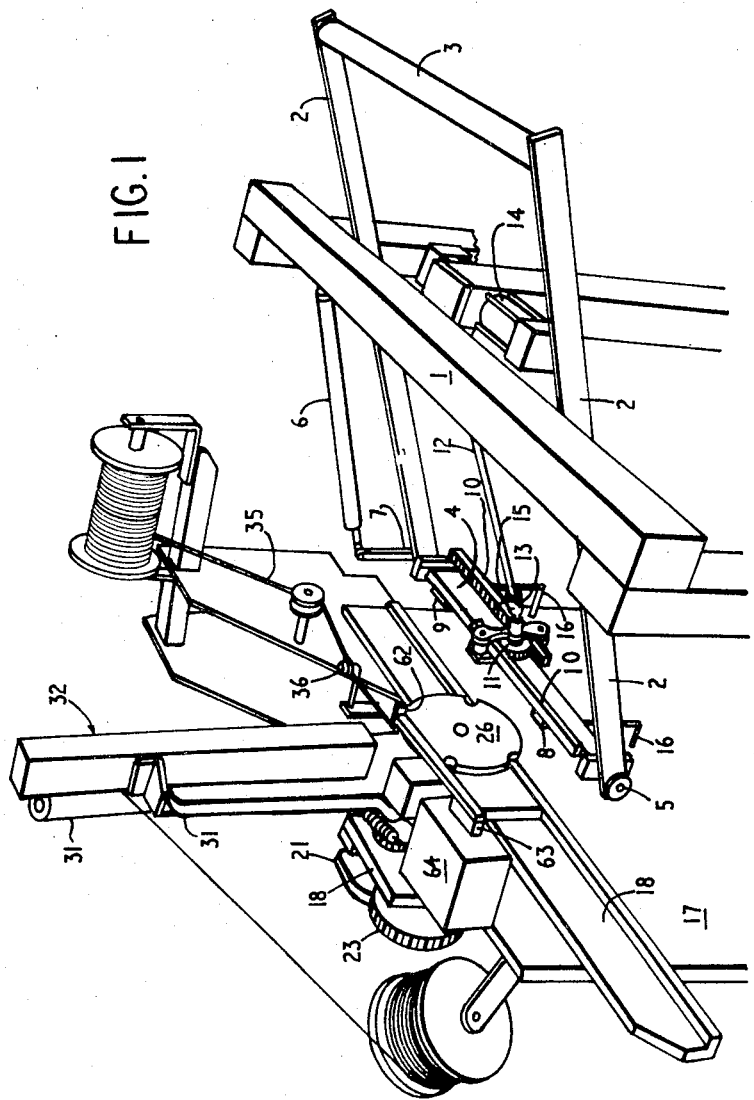
FIG. 1 is a perspective view of the machine.

The loop forming apparatus comprises a frame 1 on which is mounted a pair of inter-connected swinging arms 2 (rotated by an air cylinder not shown in non-inventive manner) tied together at one end by a bar 3 and at their other end by a rail 4 pivotally mounted as at 5 to permit the rail 4 to be partly rotated relative to the arms 2. The part rotation of the rail 4 is achieved by means of air cylinder 6 extending between a frame bar 7 and the frame 1. Two carriages 8 and 9 are mounted on the rail 4, each carriage incorporates a rack extension 10. The two rack extensions are engaged by a rotatable pinion 11 driven by a shaft 12 through universals 13 from an air cylinder 14 (of known Kuax type) having two pistons joined by a piston rod with a rack cut therein, the rack being in driving engagement with a gear, the gear is direct coupled to the shaft 12. From each carriage 8 and 9 there is a downwardly extending bar 15, each bar 15 has two parallel fingers 16. It will thus be seen that by rotation of shaft 12 the two carriages 8 and 9 can be brought together or separated also that by operation of air cylinder 6 the four fingers 16 can be moved in unison through an arc.

The remainder of the loop forming machine comprises a main support frame 17. Transversely mounted on the frame 17 is a number of inter-connected shafts supported principally in plates 18.

Figure 2:
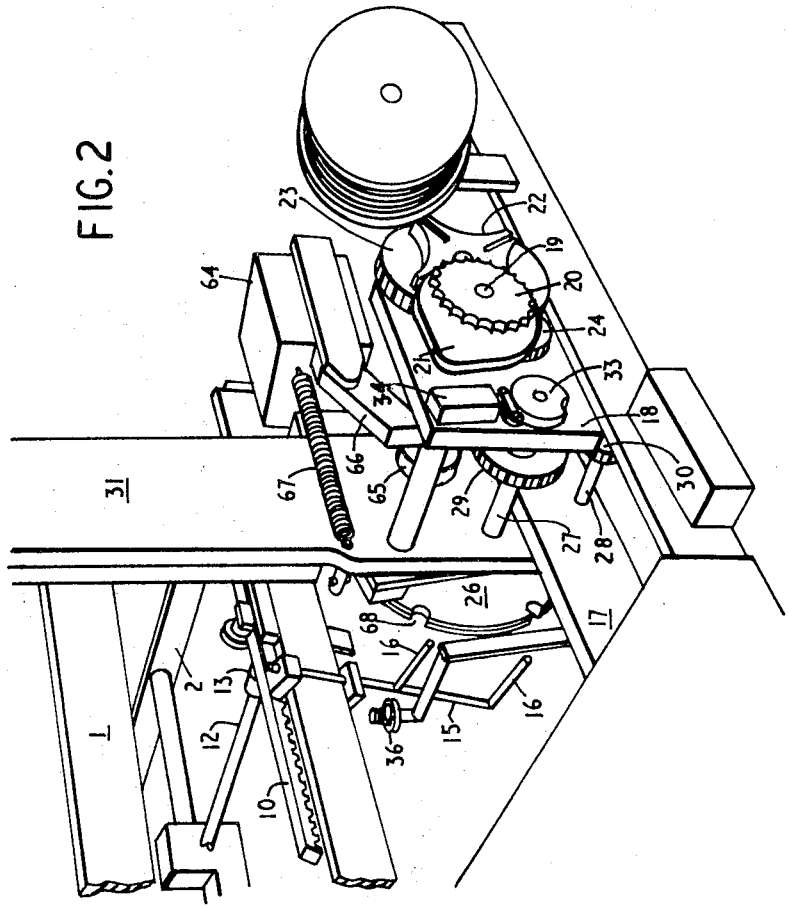
FIG. 2 is a perspective view of the machine drive.
Figure 3:
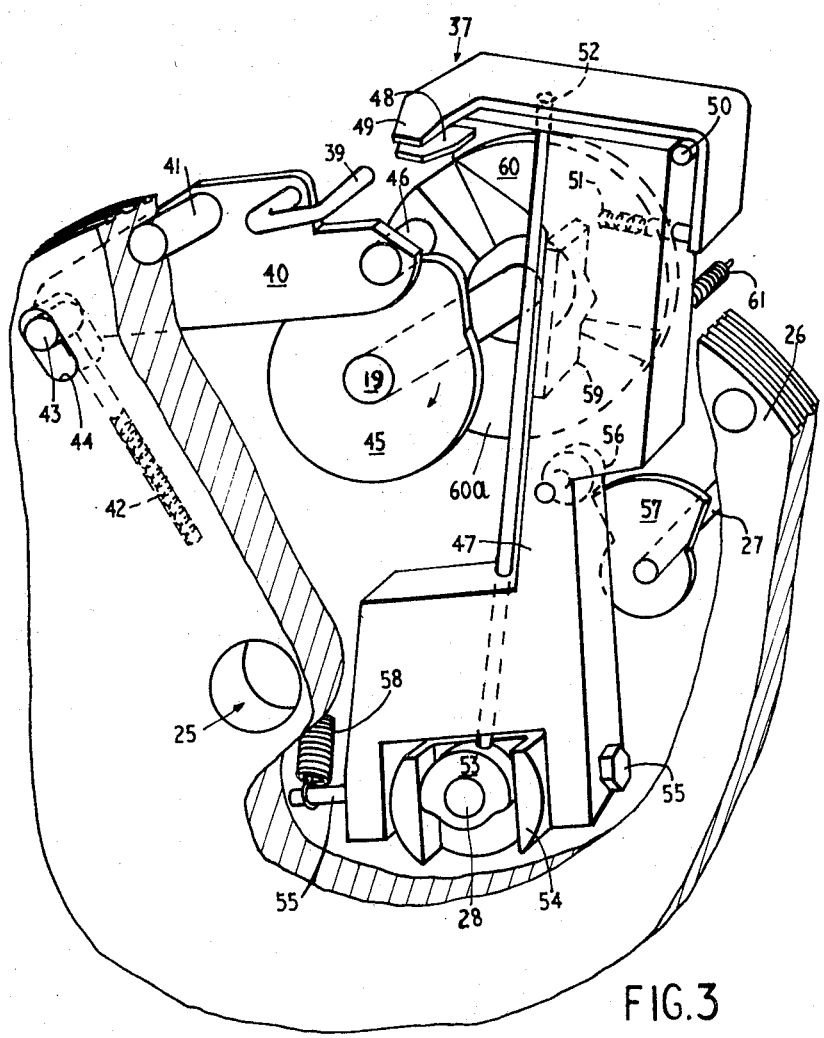
FIG. 3 is an enlarged fragmentary view of part of the machine drive.

The shafts are best illustrated in FIGS. 2 and 3 and comprise a main drive shaft 19 on which there is a sprocket 20 whereby a drive can be applied to the shaft 19 from an outside source. Also fixed to the shaft 19 is the driving member of a Geneva action movement (of known type) indicated generally at 21. The driving member 21 of the Geneva action movement engages a driven member 22 of the Geneva action movement thereby imparting intermittent motion to the gear 23 coupled thereto. The gear 23 drivingly engages gear 24 which is fixed to a shaft 25 (See FIG. 3) carrying a work head 26. The ratio of the gears 23 to 24 is such that for one quarter revolution of the gear 23 there is a full revolution of the gear 24 and thus of the work head 26. The shaft 19, the shaft 27 and shaft 28 see FIG. 2 are interconnected by gears indicated 29, 30, a gear (not shown) so as to control the operation of cams and levers and other members to be hereinafter described in order to fulfill the functions of the various components which work in co-operation with the work head 26.

Attached to the plate 17 there is a mast 31 with a standard wire stitcher (sold commercially under the trade mark BOSTITCH with a code number 2601AC) vertically mounted thereon. The stitcher is indicated by the numeral 32 and is operated by an air cylinder in known manner. The stitcher air cylinder is controlled by cam 33 on shaft 27 and air control 34.

Figure 4:
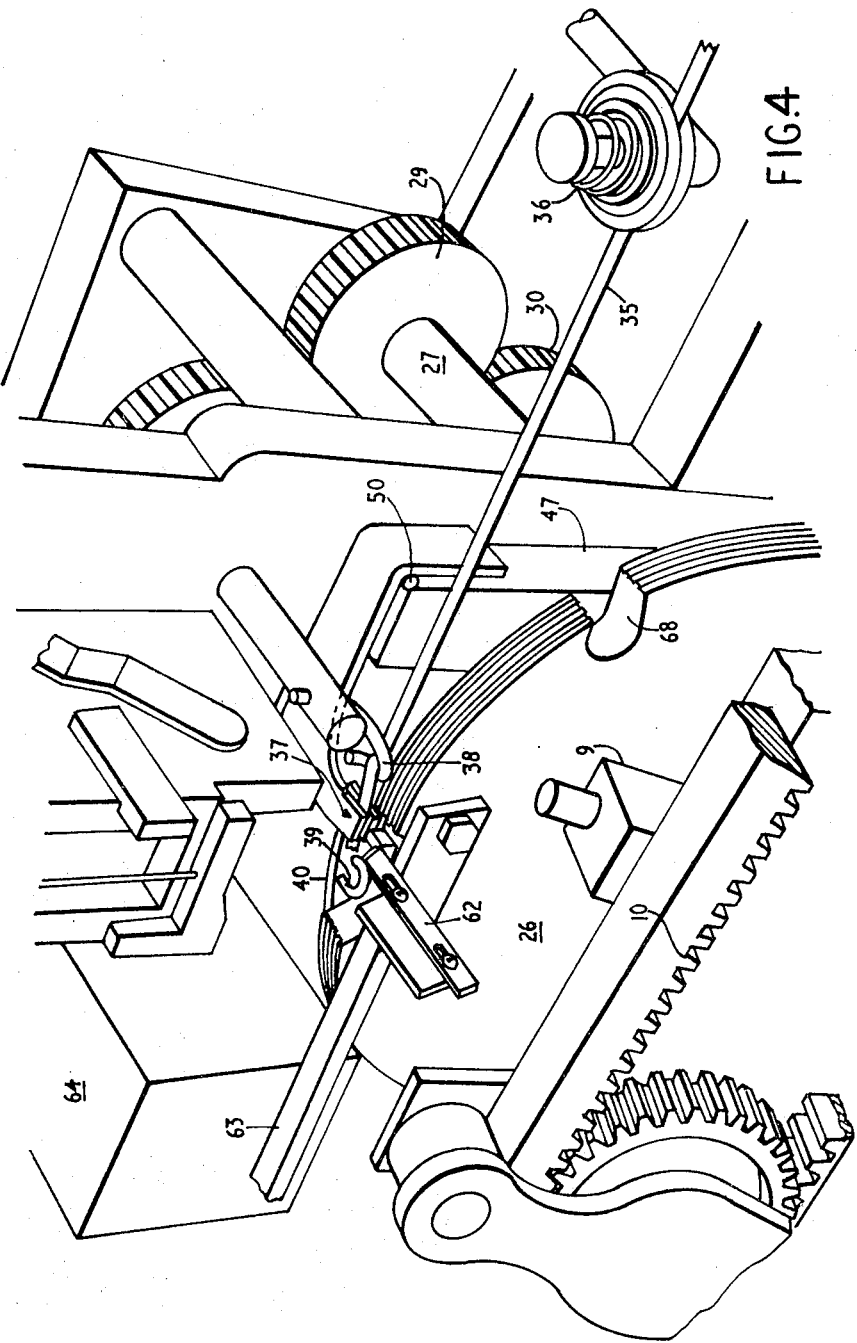
FIG. 4 is a fragmentary view of part of the machine at the commencement of an operating cycle.

Elastic 35 is fed from any suitable source through a tensioner 36 to the work head 26 where the end of the elastic is nipped between the two jaws of the beak 37 after the elastic is run through a stationary support member 38. The beak 37 has a path of travel from a first position to the right of the stitcher as shown in FIG. 4 laterally to the left of the stitcher 32 to advance the elastic to a position where it will be gripped between gripper bar 39 and an anvil 39a portion in a cut out in the work head 26.

Figure 5:
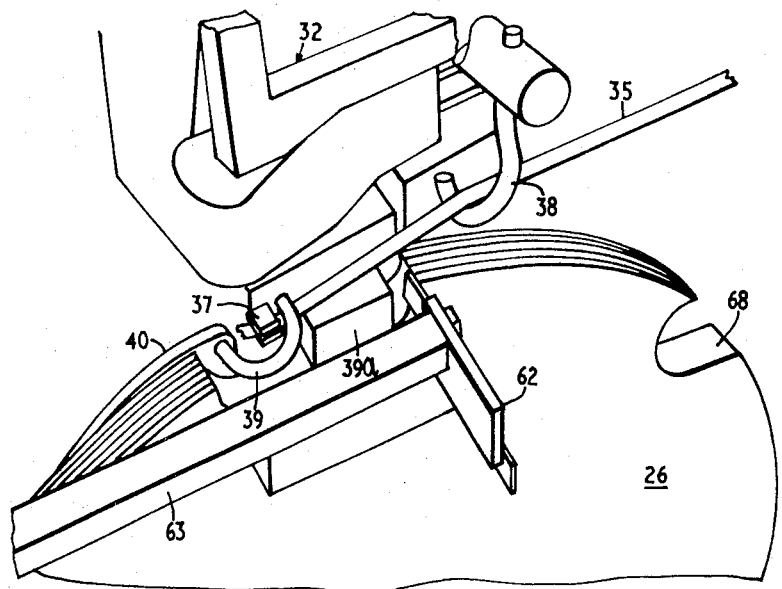
FIG. 5 is a view similar to FIG. 4 after part of an operating cycle.
Figure 6:
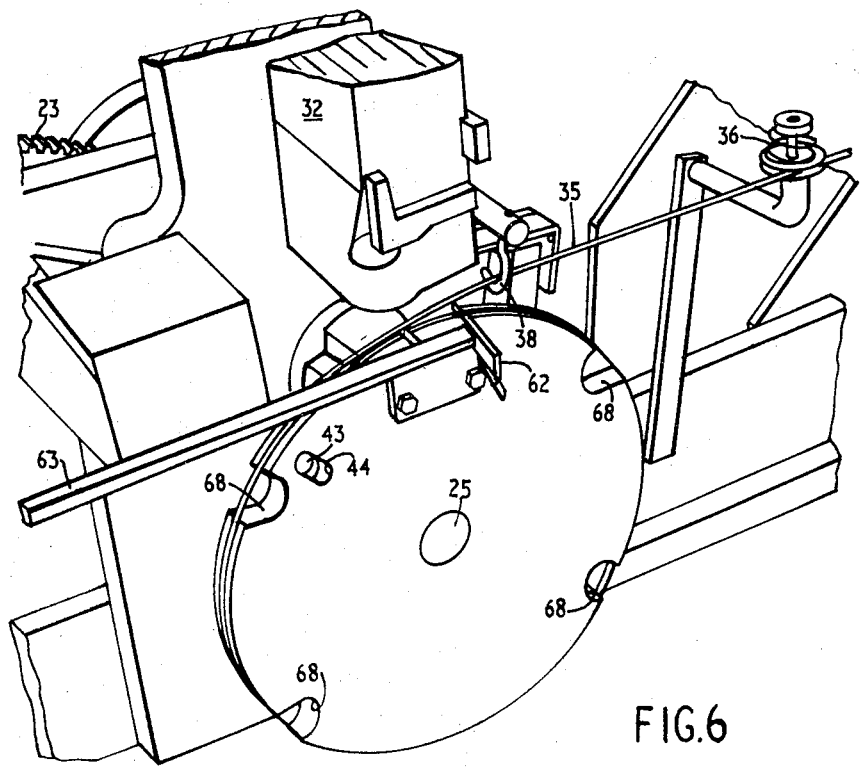
FIG. 6 is a view similar to FIG. 5 at the later stage in the operating cycle.

The gripper bar 39 is fixed to an arm 40 pivotally supported by a stub axle 41 rotatable in a hole in the work head 26. The bar 39 is biased to its gripping position by a spring 42 housed in a socket in the work head 26. The spring 42 engages a stud 43 slidable in a slot 44 in the work head 26. The gripper 39 is raised from its gripping position by the action of a cam 45 (on shaft 19) acting on stud 46 on the arm 40. This can only occur when the work head 26 is at rest as shown in FIG. 5 which illustrates the situation where the gripper 39 is gripping the end of the elastic just released by the beak 37 which has taken up its retracted and thus hidden position. The beak 37 is mounted on an arm 47 and comprises a first part 48 fixed to the arm 47 and a movable part 49 pivoted as at 50 to the arm 47. The parts 48 and 49 are biased into engagement with each other by spring 51 housed in arm 47 and separated by the movement of rod 52. The rod 52 is slidably mounted at the upper and lower ends of the arm 47 and is moved by cam 53.

The arm 47 is forked at its lower end and has a swivel block 54 mounted by axles 55 in the fork limbs. The swivel block 54 has a central opening where it is rotatably mounted on shaft 28. The cam 53 fixed to the shaft 28 acts as a collar to retain the swivel block 54 in place. A cam follower 56 on the arm 47 is urged into engagement with a cam 57 on the shaft 27 by a spring 58 extending between an axle 55 and the frame 17.

On the arm 47 there is also a cam follower 59 which is urged into engagement with a face cam 60 by a spring 61 extending between the arm 47 and the frame 17. The cam 60 is fixed to shaft 19.

The operation of the mechanism just described is as follows. One rotation of shaft 19 causes a quarter turn of gear 23 which, acting on the gears on shafts 25, 27 and 28, causes rotation of these shafts. Assuming the beak 37 is in the position shown in FIG. 4 it will be closed, as the rod 52 will be on the low part of cam 53 and will be forward because follower 59 will be on the raised part 60a. The arm 47 will be moved to the left as shown in FIG. 5, by the cam and roller combination 56–57 past gripper bar 39 which will be raised by reason of the stud 46 being on the lift part of cam 45. The stud 46 will drop onto the low part of the cam 45 as shaft 19 rotates and the gripper bar 39 will drop behind the beak 37 to grip the elastic held by the beak 37 against the anvil 39a. The beak is then opened by continued rotation of shaft 28 and the cam 53 acting on the rod 52. The beak is retracted as the shaft 19 rotates and the cam follower 59 drops onto the low part of the cam 60 under the influence of spring 61. The beak 37 is then moved to the right due to the follower 56 dropping onto the low part of cam 57 and the influence of spring 58. The beak 37 will remain in its retracted (to the right) position until the cam follower 59 again moves onto the raised part of the cam 60, at this time the rod 52 is still on the raised part of the cam 53 therefore the beak 37 is open. As the beak advances and closes the work head 26 will complete its single revolution thereby forming the circle of elastic and the beak 37 is then closed onto the elastic prior to the stapler 32 being operated by stapler air cylinder to stitch together the portion of elastic just behind the gripper 39 and the elastic overlying that portion. Subsequent to the stapling operation a cutter indicated at 62 which is supported on arm 63 and vibrated by vibrator 64 is brought into elastic severing position in front of the beak by means of the co-operation of cam 65 and arm 66 which is pivotally mounted on the frame 17 and biased to a rest position by spring 67. The performance of the foregoing operations results in the manufacture of a stapled loop of elastic with the leading end of the supply of elastic firmly gripped in the beak ready for a repeat of the loop forming and stapling operations.

Figure 7:
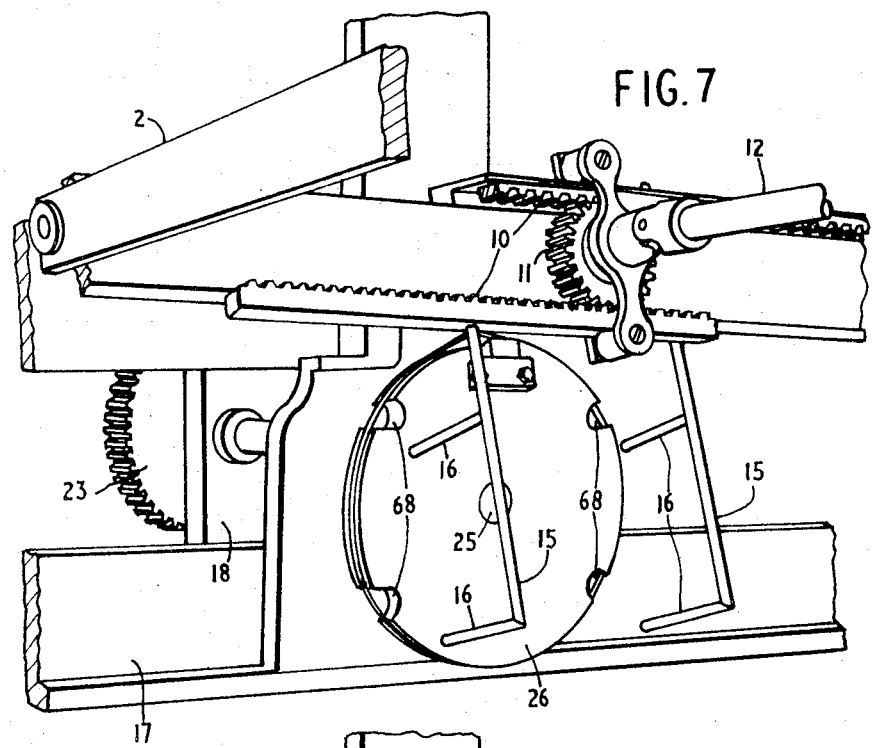
FIG. 7 is a view similar to FIG. 5 at a still later stage in the operating cycle and FIG. 8 is a view similar to FIG. 7 where the loop is being removed after completion.
Figure 8:
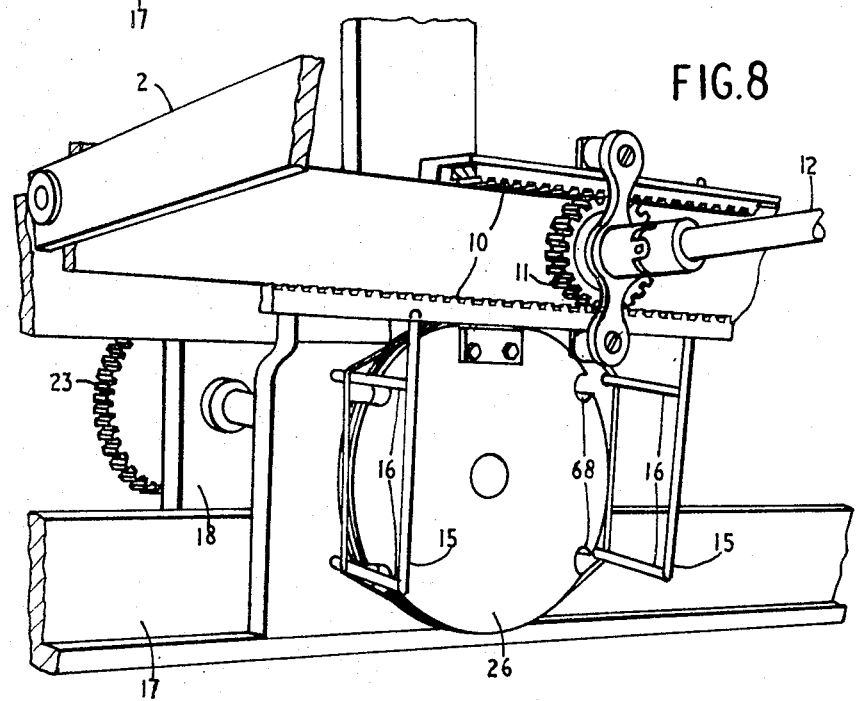

During the performance of the loop forming operation the arms 2 have remained in the position shown in FIG. 1 with the bars 15 vertically extended and widely spaced apart. This is a preferred position but alternatively the arms 2 could be raised, the bars 15 could be closely spaced and angled as shown in FIG. 7. Subsequent to the position of FIG. 7 being achieved, either as a primary or secondary position, the cylinder 6 is actuated to swing the fingers 16 into opening 68 provided in the work head 26. Subsequent to the insertion of the FIGS. 16 in the openings 68 cylinder 14 is actuated to cause the bars 15 to be moved apart thereby causing the finished loop to adopt the configuration shown in FIG. 8. The cylinder 6 is again actuated to cause the bars 15 to re-adopt the position shown in FIG. 7 with the loop of elastic stretched around the tilted fingers 16. The rail 4 is lowered as the arms 2 are rotated. The rail 4 can be either tilted to make the bars 15 vertical to align the elastic loop with an object or garment passing beneath the loop forming mechanism or so as to locate the loop adjacent a collection point for removal by either manual or mechanical means.

As an example, the loop could be located over a collector, the bars 15 could be brought towards each other so as to leave the loop mounted on the collector and the fingers 16 could then be withdrawn.

It will of course be understood that the main object of the invention is to manufacture loops of elasticised material the transfer mechanism is only a convenient form of stripping finished loops from the machine.

Other suitable means may be used to strip loops for example an air operated hook could be used at the end of each loop manufacturing cycle to pull the finished loop from the work head 26.

I claim:

1. A machine for manufacturing loops of elasticised material, said machine comprising a frame, bearing means on the frame, a rotatable work-head having a circular periphery, a central shaft on the work-head mounted rotatably in the bearing means, a material severing device on the frame, a stitching machine on the frame, an anvil in the periphery of the work-head in operative relationship to the stiching machine, a gripper on the work-head, first resilient means to hold the gripper against the anvil, first rotatable cam means on the frame to move the gripper relative to the anvil, an arm universally pivotally connected to the frame, an openable beak on the arm, second resilient means to move the arm to a position where the beak occupies a first position, second and third cam means on the frame to move the arm and thus the beak through a path of travel which is substantially rectangular the four terminal points of said path defining four operative positions for said beak, fourth cam means on the frame to open the beak, drive means to rotate said work head and move the beak between its four operative positions, the cycle of operations of said machine being; move the beak from its first position to its second position with the beak open; close the beak to grip one end of a strip of material which is to be formed into a loop; move the beak to its third position to locate the strip adjacent the beak over the anvil and under the gripper which is open; close the gripper to clamp the material on the anvil; open the beak and move it to its fourth position; rotate the work-head and at the same time move the beak from the fourth to the first position; operate the stitching machine to stitch overlying portions of the material to form a loop of material after one rotation of the work-head; move the beak to its second position and grip the material supply behind the stitch forming the loop; actuate the severing device to cut the material supply strip between the stitch and the beak and release the gripper.

2. The machine claimed in claim 1 including shafts on which the four cams are fixed, bearings in the frame to rotatably support the shafts, the connection of the arm to the frame being on the axis of the shaft of the fourth cam.

3. The machine claimed in claim 2 including a rod slidably mounted in the arm and moved axially by the fourth cam to open the beak.

4. The machine claimed in claim 2 including gears and a Geneva action which interconnect the shafts.

5. The machine claimed in claim 1 including a loop remover comprising two pairs of fingers, carriages on which the fingers are mounted, a rail on which the carriages are mounted, two pairs of cutouts in the periphery of the work-head, arms on which the rail is pivotally mounted, drive means to raise and lower the arms and move the carriages on the rail and tilt the rail relative to the arms; the relative positioning of the loop remover and the work-head being such that with the arms raised and the rail tilted the fingers can be swung into the work-head cutouts by removing the rail tilt, separation of the carriages and tilting and lowering of the rail and arms respectively, remove the finished loop and free the work-head for a further loop fabricating cycle.

* * * * *